(12) United States Patent
Bindelli et al.

(10) Patent No.: US 9,758,311 B2
(45) Date of Patent: Sep. 12, 2017

(54) METHOD AND DEVICE FOR MACHINING LARGE SIZED PLATES IN A NUMERICAL CONTROL WORKSTATION

(71) Applicant: Biesse S.p.A., Chiusa di Ginestreto (IT)

(72) Inventors: Filippo Bindelli, Chiusa di Ginestreto (IT); Paolo Gaudenzi, Chiusa di Ginestreto (IT); Gianluca Gennari, Chiusa di Ginestreto (IT); Marco Frongia, Chiusa di Ginestreto (IT); Marco Belli, Chiusa di Ginestreto (IT); Rodolfo Scatigna, Chiusa di Ginestreto (IT)

(73) Assignee: Biesse S.p.A., Pesaro Urbino (IT)

( * ) Notice: Subject to any disclaimer, the term of this patent is extended or adjusted under 35 U.S.C. 154(b) by 0 days.

(21) Appl. No.: 15/198,520

(22) Filed: Jun. 30, 2016

(65) Prior Publication Data

US 2017/0029219 A1 Feb. 2, 2017

(30) Foreign Application Priority Data

Jul. 28, 2015 (IT) .......................... 102015000039031

(51) Int. Cl.
*B65G 13/12* (2006.01)
*B65G 47/24* (2006.01)
(Continued)

(52) U.S. Cl.
CPC ............. *B65G 43/08* (2013.01); *B23Q 7/055* (2013.01); *B23Q 17/22* (2013.01); *B28D 7/046* (2013.01);
(Continued)

(58) Field of Classification Search
CPC ...... B65G 13/12; B65G 13/065; B65G 39/12; B65G 39/00; B65G 47/46; Y10T 74/14;
(Continued)

(56) References Cited

U.S. PATENT DOCUMENTS 2,062,732 A * 12/1936 Russell .................... B23Q 7/04
451/412
4,228,993 A * 10/1980 Cathers ................ B65G 49/067
198/412
(Continued)

FOREIGN PATENT DOCUMENTS

EP 1270147 A2 1/2003

OTHER PUBLICATIONS

Search report in corresponding Italian Application No. 102015000039031, dated Mar. 21, 2016.

*Primary Examiner* — James R Bidwell
(74) *Attorney, Agent, or Firm* — Young Basile Hanlon & MacFarlane, P.C.

(57) ABSTRACT

A method and device useful for material removal from large plate-shaped materials, for example machining and polishing of glass and stone. The invention includes a workstation having arrays of roller and suction cups which are selectively used to transport and secure a plate positioned in the workstation. An imaging device collects data on a true position of the plate in the workstation and compares the real position to a design or ideal position to determine a difference of position. An electronic control system calculates the difference and modifies the processing program to adjust for the difference eliminating the need to further reposition the plate to the ideal design position for processing.

12 Claims, 16 Drawing Sheets

(51) Int. Cl.
    *B65G 43/08*     (2006.01)
    *B28D 7/04*     (2006.01)
    *B65G 13/02*     (2006.01)
    *B65G 21/20*     (2006.01)
    *B23Q 7/05*     (2006.01)
    *B23Q 17/22*     (2006.01)

(52) U.S. Cl.
    CPC ......... *B65G 13/02* (2013.01); *B65G 21/2036* (2013.01); *B65G 2203/0225* (2013.01); *B65G 2203/041* (2013.01)

(58) Field of Classification Search
    CPC ....... Y10T 74/1412; B24B 7/24; B24B 7/241; B24B 7/242; B24B 9/10; B23Q 17/22
    USPC ........ 198/782, 401, 468.4; 74/2; 451/1, 5, 6, 451/105, 412
    See application file for complete search history.

(56) References Cited

U.S. PATENT DOCUMENTS

| | | | | |
|---|---|---|---|---|
| 5,297,669 | A * | 3/1994 | Neuendorf | C03B 23/03 198/782 |
| 5,609,717 | A * | 3/1997 | Pascale | E06B 3/67365 198/468.4 |
| 7,762,382 | B2 * | 7/2010 | Grundtvig | B65G 47/682 198/382 |
| 2002/0175043 | A1 * | 11/2002 | Vassel | B65G 13/10 198/782 |
| 2012/0021679 | A1 * | 1/2012 | Bando | B24B 7/245 451/412 |

\* cited by examiner

FIG. 2
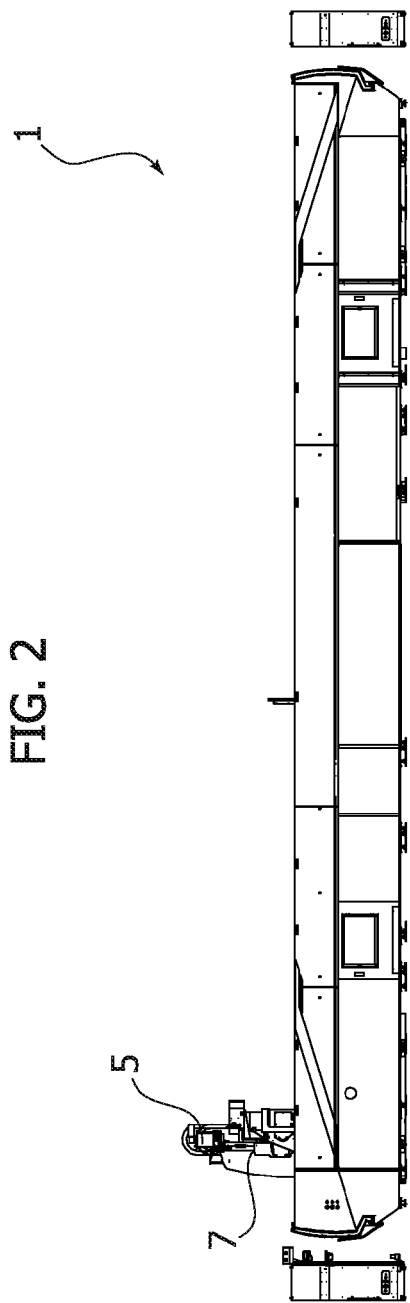
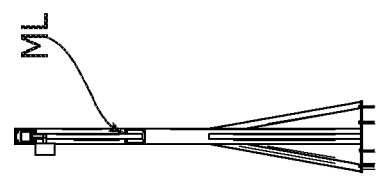
FIG. 3
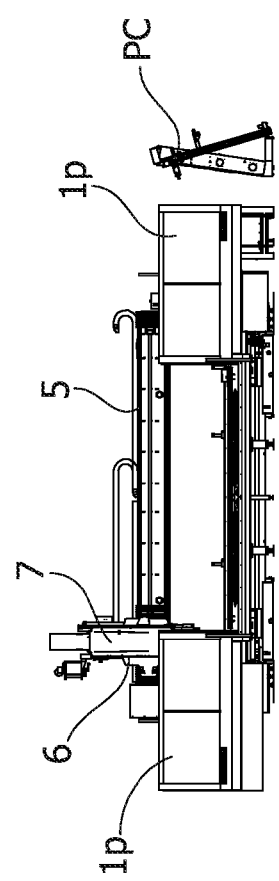

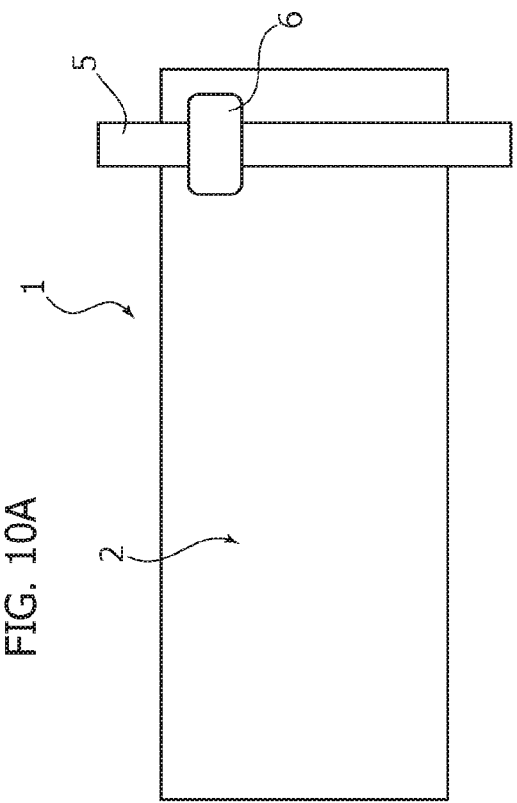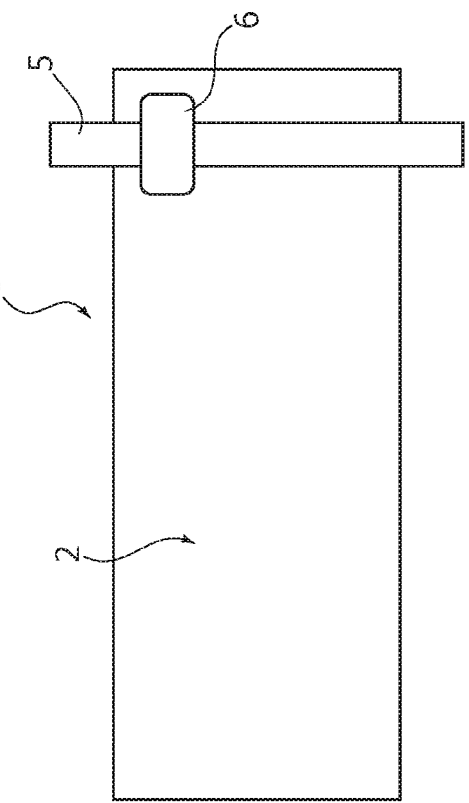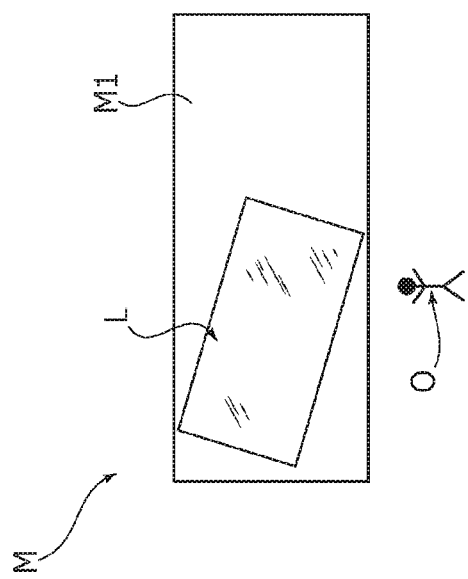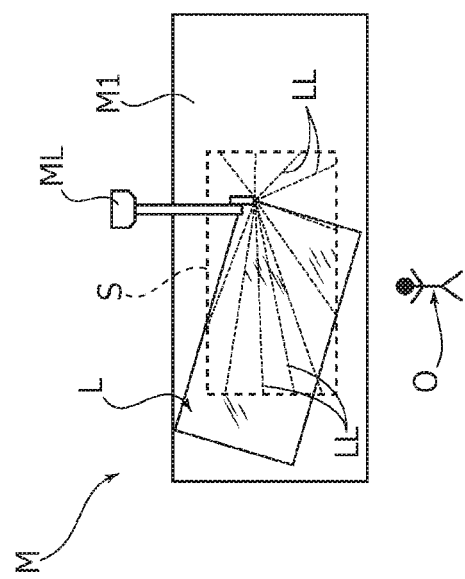
FIG. 10A
FIG. 10B

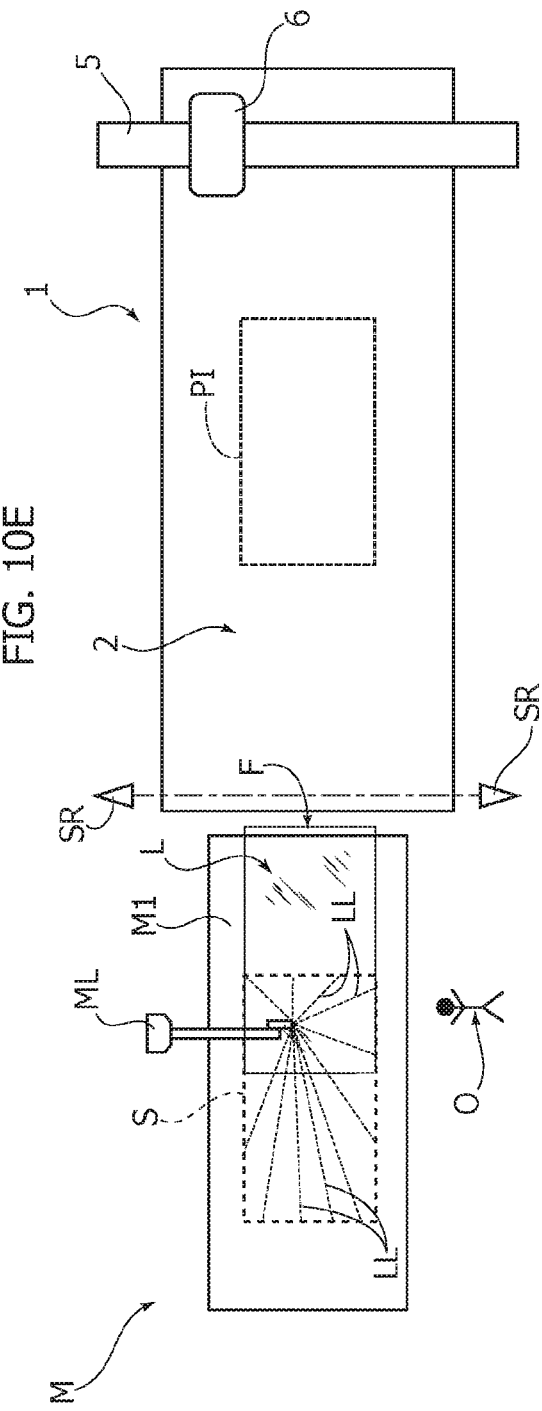
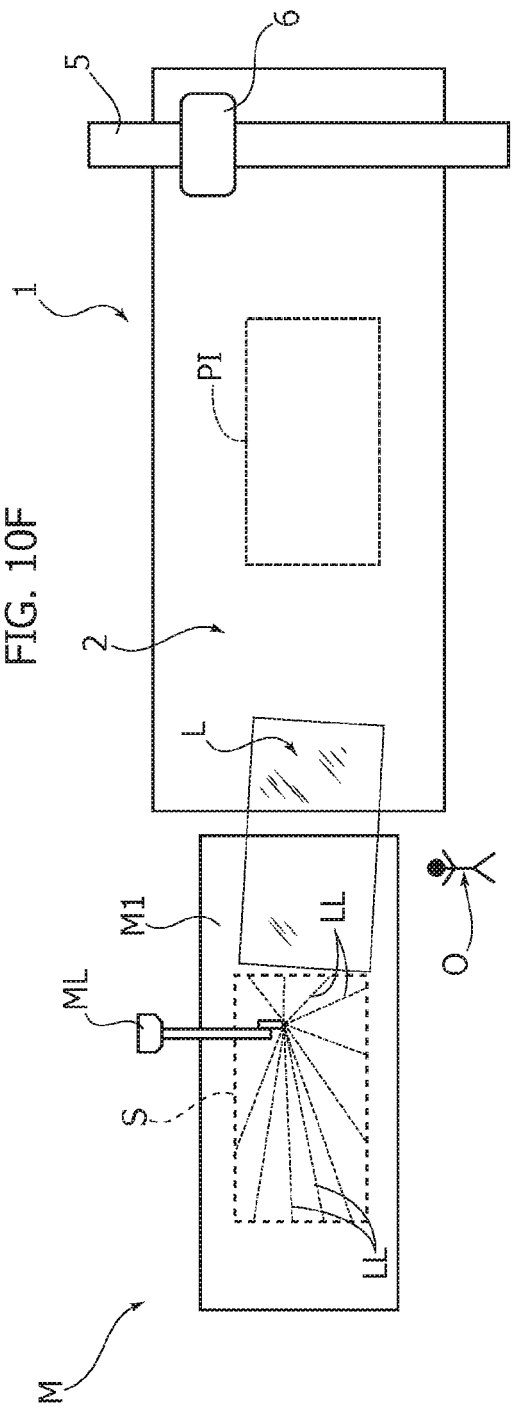

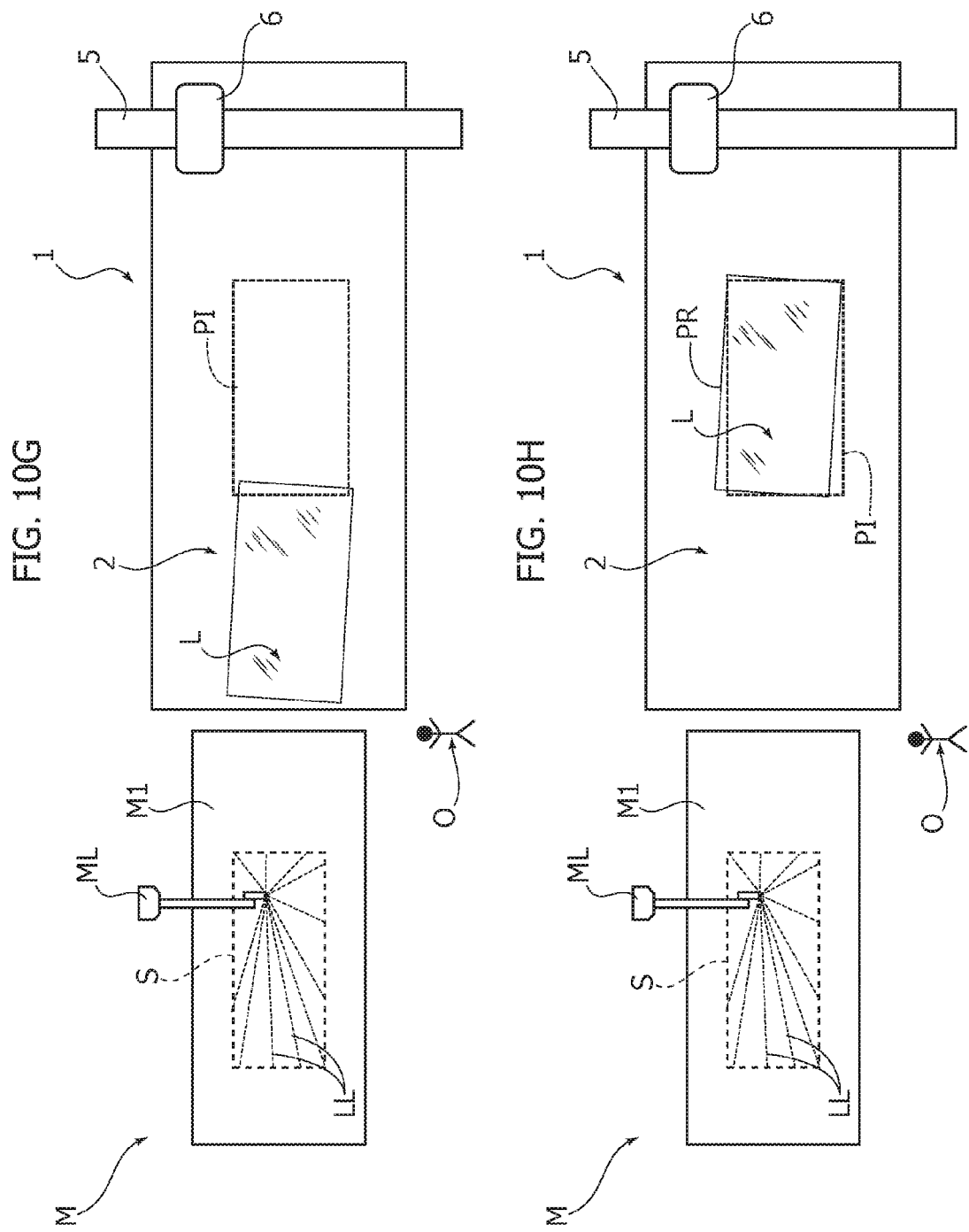

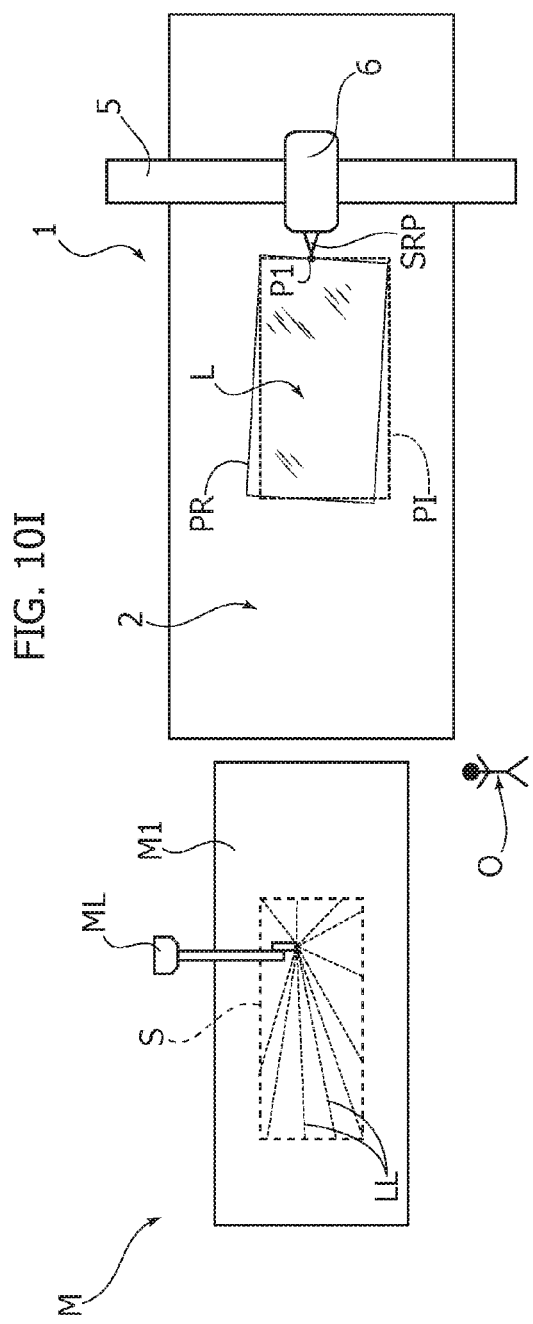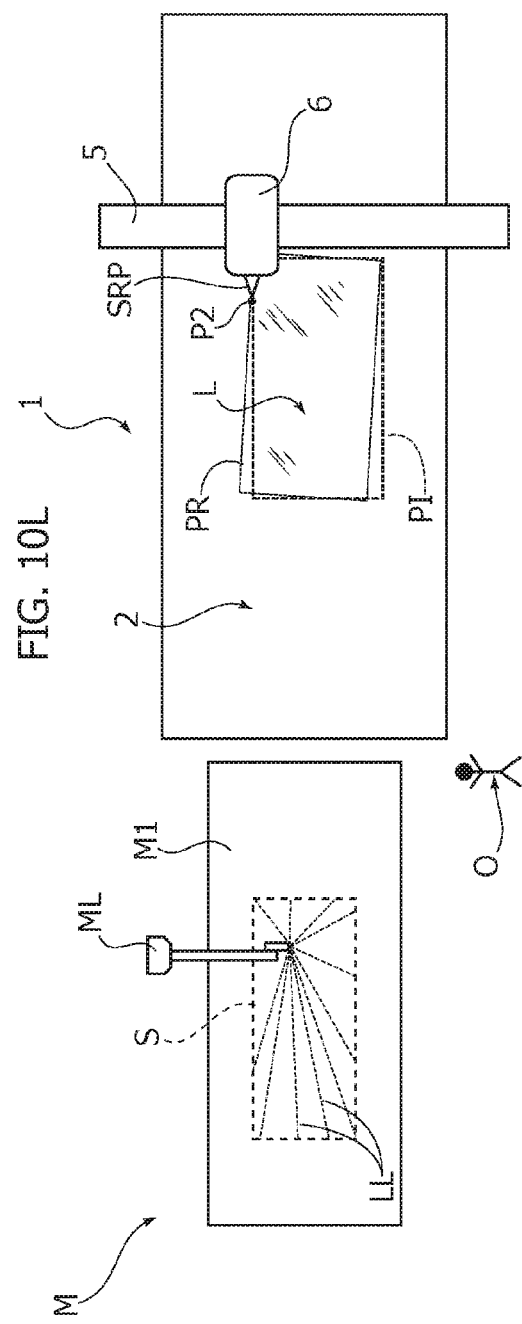

FIG. 10M
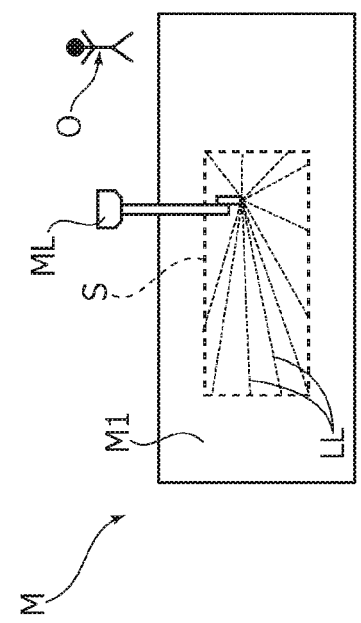
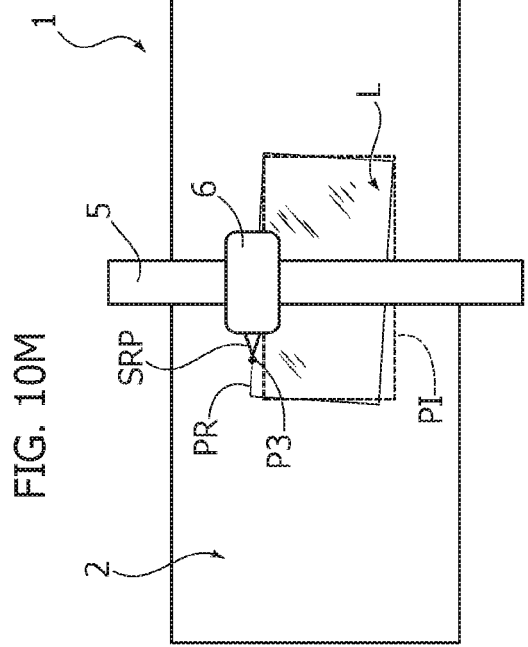
FIG. 10N
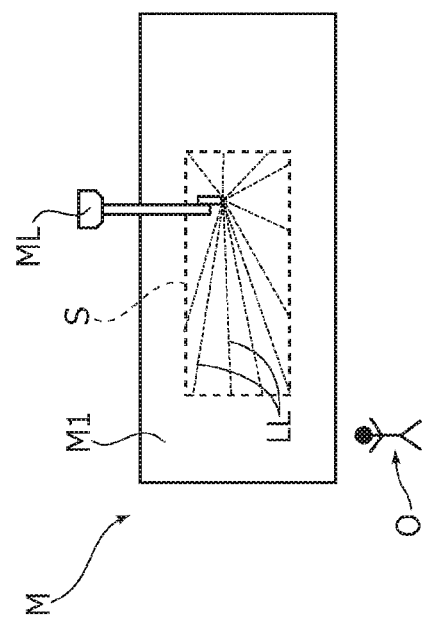
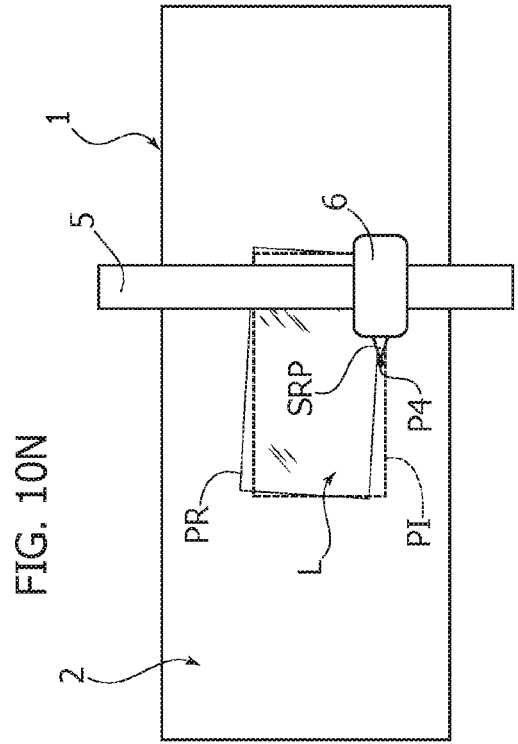

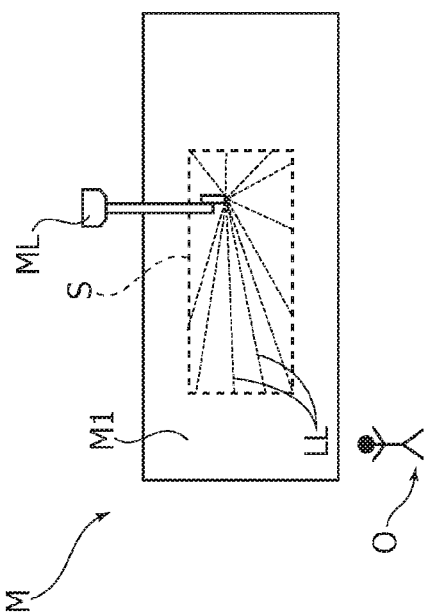
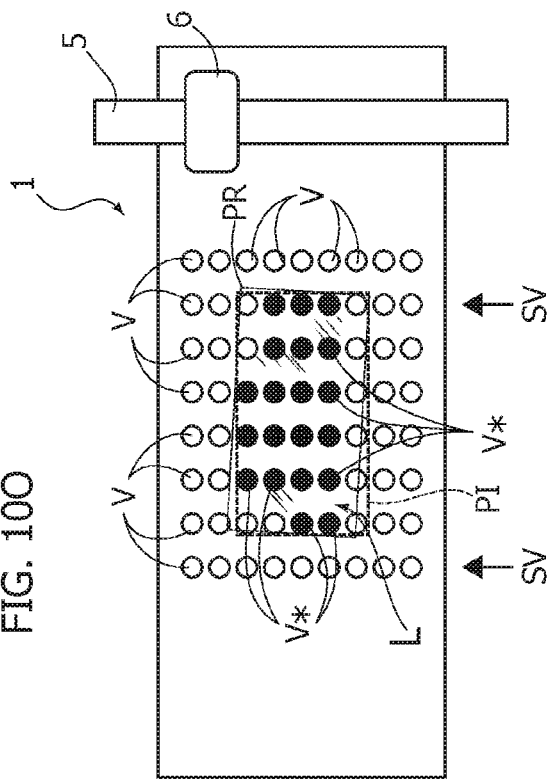
FIG. 10O
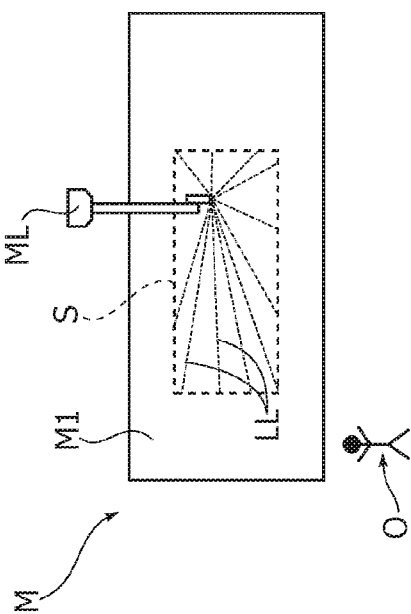
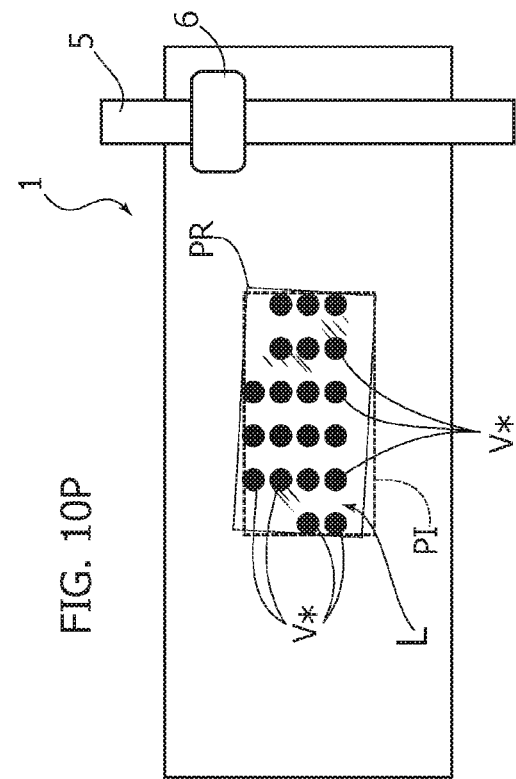
FIG. 10P

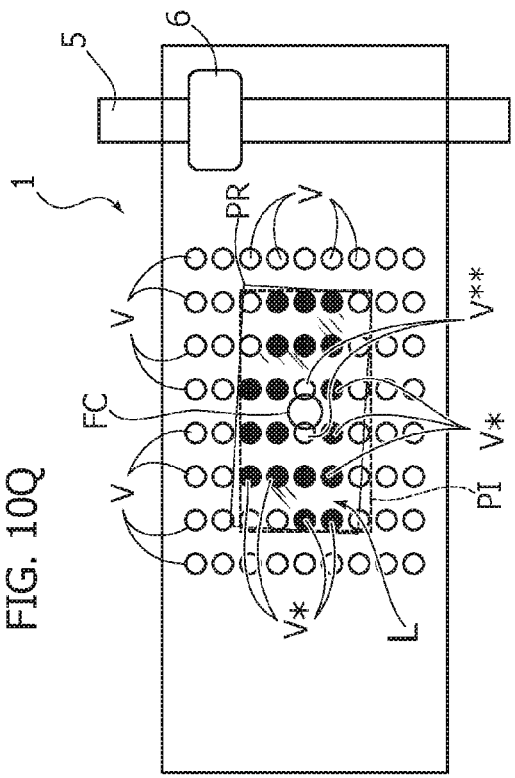
FIG. 10Q
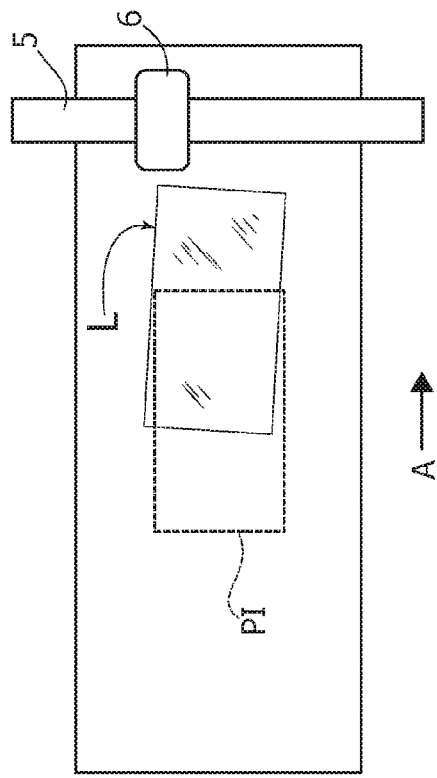
FIG. 10R
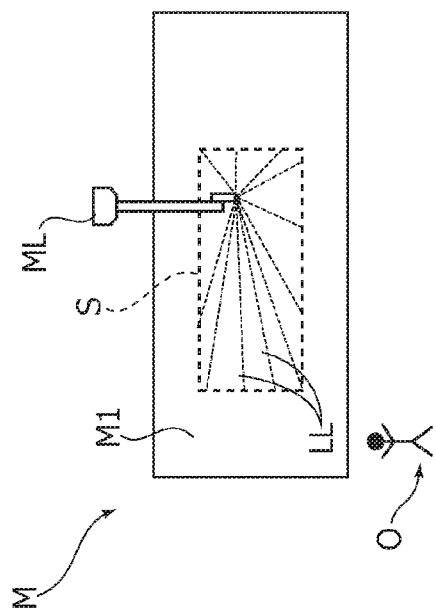
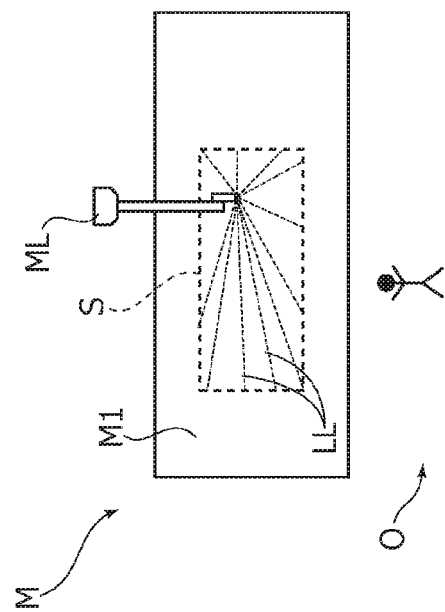

METHOD AND DEVICE FOR MACHINING LARGE SIZED PLATES IN A NUMERICAL CONTROL WORKSTATION

FIELD OF INVENTION

The present invention generally relates to the field of numeric-control workstations for machining plates of glass, marble, and natural or synthetic stones. The invention is particularly useful for machining plates of large size.

BACKGROUND

According to the conventional technique, a plate of large dimensions to be machined is placed on a bench or automatic feeding surface in a machine set upstream of the workstation.

In the known solutions, the plate is made to translate on the bench to be supplied to a workstation for machining the plate. During the operation of translation of the plate towards the workstation, the plate may not follow its theoretical path and may shift with respect to the desired position and orientation, consequently assuming a real position that departs from the ideal theoretical position. Hence, at the end of the operation of transfer of the plate, the latter is located in the workstation in a position different from the desired position.

Consequently, at present, in the workstation means are provided for repositioning the plate according to the ideal reference lines. In particular, the plate that arrives in the proximity of the theoretical machining position is first of all repositioned, to get the plate to be located at the machining origin known by the workstation.

In particular, it is necessary for the edges of the plate to be positioned in a precise way on the reference axes X0 and Y0 of the working surface that define the position of start of machining. Consequently, in current workstations automatic positioning means are provided that envisage motor-driven servos or alternative means that enable correct initial repositioning of the plate before start of the machining operation.

The above drawback is not negligible in so far as the plates of glass, stone, or marble to be machined in these workstations frequently present a considerable size and weight. This entails a greater structural complexity of the workstation and a costly tooling of the bench.

SUMMARY OF THE INVENTION

The object of the invention is to solve the technical problems mentioned previously. In particular, the object of the invention is to provide a method for machining a plate of glass, marble, stone, or the like in a workstation that is able to carry out these machining operations on the plate as it is located at the end of translation, i.e., after it has been fed to the workstation by a machine located upstream.

The above solution eliminates the need to reposition the plate preliminarily, guaranteeing maximum efficiency, functionality, and versatility and affording a simpler and less costly structure of the bench of the workstation. In particular, the object of the invention is also to reduce the times of inactivity of the workstation, for example the times due to repositioning. The object of the invention is achieved by a method for machining a plate of glass, marble, stone, or the like that presents the characteristics which form the subject of one or more of the annexed claims, which form an integral part of the technical teaching provided herein in relation to the invention.

In particular, the object of the invention is achieved by a method for machining a plate of glass, stone, marble, or the like implemented in a workstation for machining plates having the characteristics that have already been indicated above and moreover characterized in that the method comprises the following steps:

pre-arranging on a surface upstream of the workstation the plate to be machined in the correct position prior to entry of the plate into the workstation;

feeding the plate set in the correct position to the workstation and causing it to advance longitudinally along said working surface defined by said motor-driven rollers, operating said motor-driven rollers until the plate is brought into the initial machining position;

detecting the real position and orientation of said plate with respect to said working surface by means of a position-detection system;

modifying the program for actuation of the cycle of machining of the plate on the basis of detection of the real position made in the previous step; and carrying out machining of the plate by operating the motor means for controlling the movements of the cross member, of the carriage, and of the operating head on the basis of the modified program for actuation of the machining cycle.

In greater detail, the present invention relates to a machining method in a workstation that is able to carry out both machining operations of cutting and machining operations of milling or grinding of plates of large dimensions.

In particular, the invention regards a machining method in a workstation of the known type, comprising:

a bench, defining a working surface designed to receive a plate to be machined;

a plurality of translation means in the form of motor-driven rollers, aligned and arranged in transverse arrays on said bench, said motor-driven rollers being mobile between a raised, operative, position, in which they are in contact with the bottom surface of the plate for moving the plate, and a lowered, resting, position, in which they are set at a distance from the bottom surface of the plate to enable machining of the plate;

a plurality of blocking means in the form of telescopic suction cups aligned and arranged in transverse arrays on said bench, in an alternating way with respect to said arrays of motor-driven rollers, said suction cups being mobile between a raised, operative, position, in which they are in contact with the bottom surface of the plate and hold it in position to enable machining of the plate, and a lowered, resting, position, in which they are set at a distance from the bottom surface of the plate to enable movement of the plate via the aforesaid rollers;

two fixed sides arranged at the two sides of the working surface;

an overhead cross member guided on the two sides like an overhead travelling crane, in a horizontal direction Y orthogonal to the horizontal direction X of the cross member;

a carriage mobile in the aforesaid horizontal direction Y on the cross member;

an operating head, mobile on the carriage in a vertical direction Z and equipped with a spindle unit including a spindle, which can be coupled to a machining tool, and the corresponding electric drive motor;

motor means for controlling the movements of the cross member, the carriage, and the operating head along the three orthogonal axes X, Y, Z, respectively;

motor means for controlling the movements of said arrays of rollers and selectively of said suction cups along the axis Z; and electronic means for controlling said motor means.

In particular, the method proposed envisages equipping a workstation with a system for transfer, detection of the real position, and blocking of a plate of glass, or stone material, for carrying out the machining operations typical of such workstations.

In particular, the principle consists in detecting the origin of the position of the plate to be machined after it has been transferred at input by a machine set upstream of the workstation. The machine set upstream is equipped with a surface for supporting and moving the plate so as to feed it into the correct position into the workstation. The workstation is able to carry out machining on the plate, without requiring the presence of a mechanical system for translation of the plate to bring it back again into its theoretical initial position with known co-ordinates.

BRIEF DESCRIPTION OF THE DRAWINGS

The invention will now be described with reference to the annexed drawings, which are provided purely by way of non-limiting example and in which:

FIGS. 2 and 3 show in particular a side view and a front view of the workstation;

FIG. 10A is a schematic of an example of a first step of operation;

FIG. 10B is a schematic example of an operation step subsequent to FIG. 10A;

FIG. 10E is a schematic example of an operation step subsequent to FIG. 10D;

FIG. 10F is a schematic example of an operation step subsequent to FIG. 10E;

FIG. 10G is a schematic example of an operation step subsequent to FIG. 10F;

FIG. 10H is a schematic example of an operation step subsequent to FIG. 10G;

FIG. 10I is a schematic example of an operation step subsequent to FIG. 10H;

FIG. 10L is a schematic example of an operation step subsequent to FIG. 10I;

FIG. 10M is a schematic example of an operation step subsequent to FIG. 10L;

FIG. 10N is a schematic example of an operation step subsequent to FIG. 10M;

FIG. 10O is a schematic example of an operation step subsequent to one or more of FIGS. 10I-N;

FIG. 10P is a schematic example of an operation step showing use of suction cups V*;

FIG. 10Q is a schematic example of an operation step for exemplary use in a drilling operation; and FIG. 10R is a schematic example of an operation step to transfer a plate L.

DETAILED DESCRIPTION

Illustrated in the ensuing description are various specific details aimed at providing an in-depth understanding of the embodiments. The embodiments may be provided without one or more of the specific details, or with other methods, components, materials, etc.

According to the conventional technique, a plate to be machined of large dimensions is transported into a workstation so as to undergo the machining operations of cutting, milling, drilling, grinding, or polishing.

Represented in each figure is an orthogonal cartesian triad XYZ, for which the ensuing correspondence applies:

direction X: the longitudinal direction of the workstation (e.g., the direction of plate feed);

direction Y: the transverse direction of the workstation (e.g., the direction of the cross member); and direction Z: the vertical direction.

In the case where, in the present description, geometrical axes (of rotation, etc.) are designated with a reference including a letter X, Y, or Z followed by a second letter, the choice of the first letter is to be understood as identifying the orientation of the axis with respect to the cartesian triad defined previously.

Moreover, in the present description, terms such as "longitudinal", "transverse", "vertical", and the like are always used with reference to the directions X, Y, Z mentioned above, whether they refer to the workstation, the cross member, or the various means with which the bench is equipped.

In some of the figures annexed to the present application, the plate L to be machined is not illustrated to render the constructional details of the workstation 1 and of the machine M set upstream more clearly visible.

Figure 1:
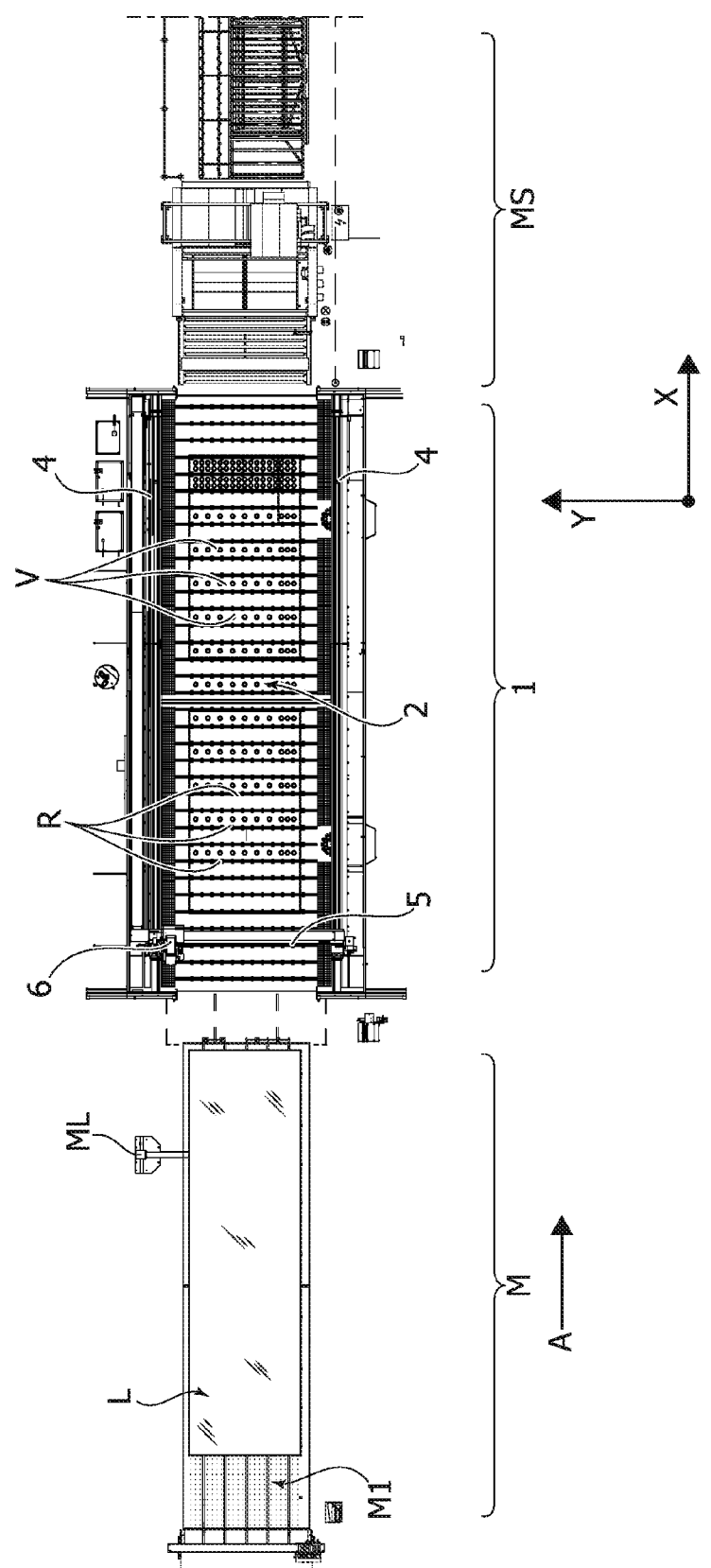
FIG. 1 illustrates by way of example a workstation for machining plates of glass, marble, or the like on which the method according to the invention may be implemented, with a surface for feed of the plates set upstream and an unloading surface set downstream of the workstation.

With reference to FIG. 1, a plate L to be machined is positioned on a machine M located upstream of the workstation 1, in particular on a resting surface M1 equipped with means for movement of the plate. The plate L arrives on the machine M "longitudinally" in the direction X and in the sense indicated by the arrow A, which also indicates the sense of feed that carries the plate L to the workstation 1.

As a general note, terms such as "upstream", "downstream", and the like in the present description are used with reference to the direction of feed along X and to the feed in direction A of the plate L along the working surface, which proceeds from left to right in all the figures, i.e., from the machine M as far as the workstation 1, and is then unloaded downstream, for example in a machine MS for unloading the plates.

The plate L is rested on the surface M1 of the machine M in any known way (it may, for example, arrive from a previous machining or conveying station or be loaded directly onto the working surface via an automatic loader, such as a vertical magazine loader, for example with the aid of an operator O).

The machine M is equipped with means for projecting onto the surface M1 guidelines that represent the complete or partial geometry with real dimensions of the plate to be machined. In particular, as illustrated in the annexed drawings, for example FIG. 10B, the machine M may comprise a laser device ML for geometrical projection that projects onto the surface M1 the shape S of the plate L for guiding and facilitating the operation of initial correct positioning of the plate L.

In various embodiments, the input bench M1 is typically a bench with belts or means for movement of the plates with a continuous surface in order to favour projection of the laser beam representing the piece of real dimensions.

In particular, the surface M1 is equipped with means for assisting movement of the plate, which enable displacement of the plate L on the surface M1 with an operating force of low intensity.

Figure 8:
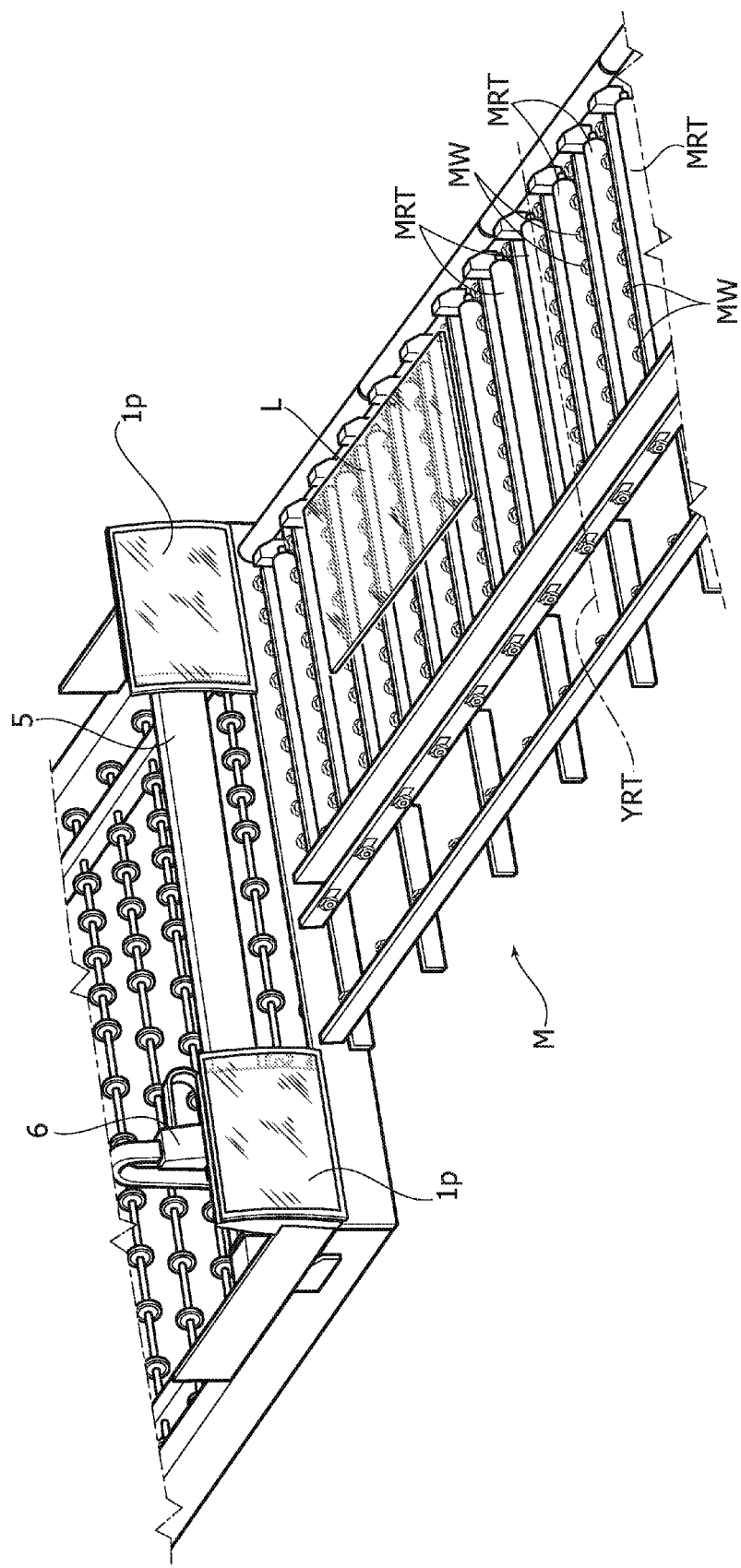
FIGS. 8 and 9 show by way of example details of the surface for feed of the plates coming from the machine set upstream of the workstation.
Figure 9:
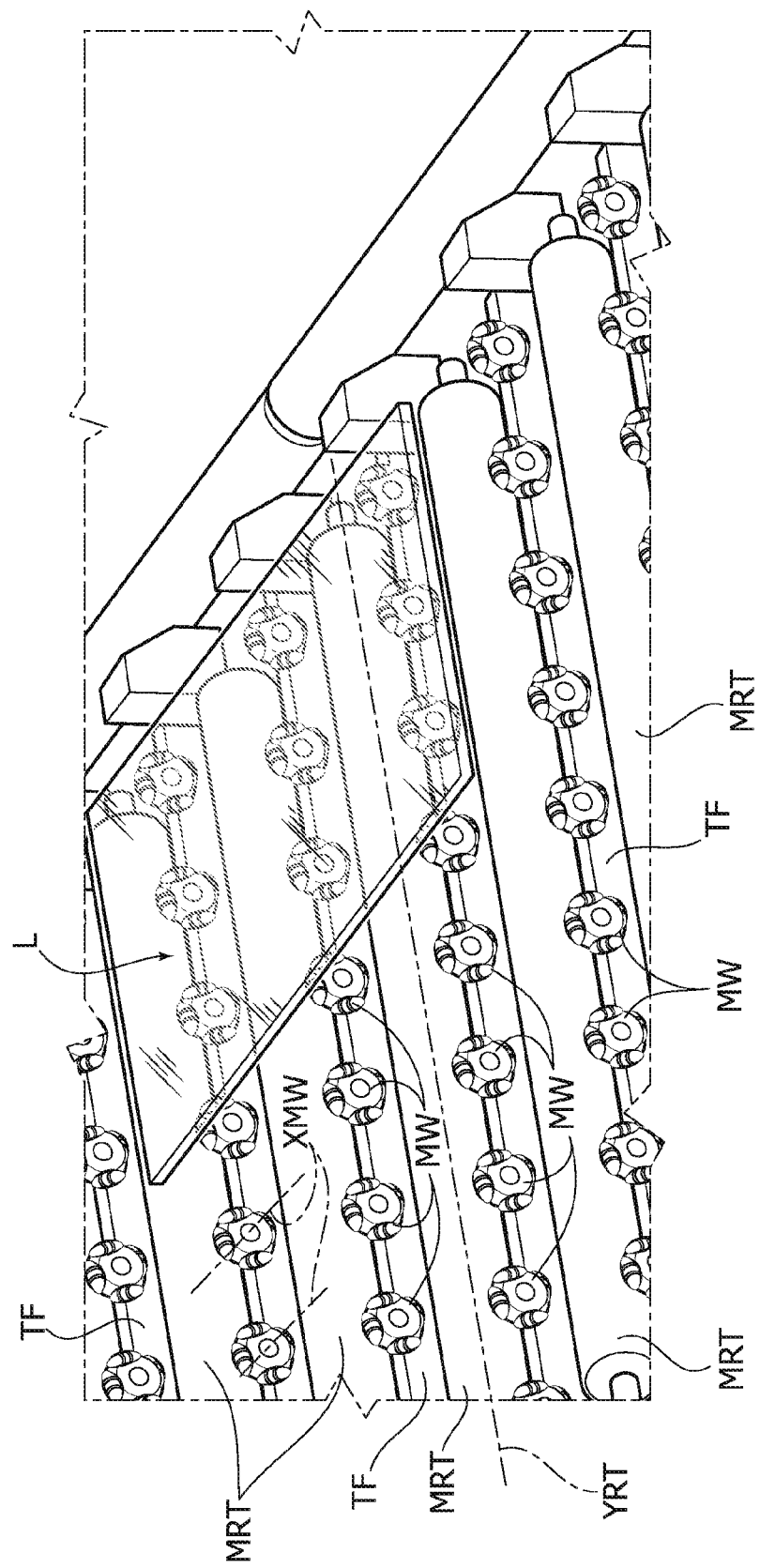

With particular reference to FIGS. 8 and 9, the surface M1 of the machine M is equipped with a plurality of conveying rollers MRT, which may be motor-driven so that they turn about the transverse axes YRT. The conveying rollers MRT extend over the entire surface M1 and enable feed of the plate L in the direction indicated by the arrow A in the longitudinal direction X of the machine M.

In addition, the surface M1 is equipped with arrays of idle wheels MW with longitudinal axes of rotation XMW that enable movement of the plate L in the transverse direction Y of the surface M1. In particular, each array of wheels MW is carried by a fixed cross member TF. The fixed cross members TF extend transversely over the surface M1 and are arranged in an alternating way with respect to the conveying rollers MRT.

The supporting and movement structures of the machine M, the constructional details, etc. are not illustrated or described in detail, in so far as they can be provided in any known way and also in so far as, taken by themselves, they do not fall within the scope of the present invention.

In particular, the displacements in the two orthogonal directions X and Y occur at successive moments. Normally, the first displacement is in the direction X and is obtained by exploiting the conveying rollers MRT already engaged to the plate L, while the wheels MW are in a lowered condition. Next, the wheels MW, which are mobile in the vertical direction Z, are raised, and engage the bottom surface of the plate L, and raise it with respect to the conveying rollers MRT so that the plate L can be moved also in the direction Y.

Thanks to the structure of the surface M1, the plate L, once rested on the above surface M1, can be easily displaced in the directions X and Y to be positioned in a relation of superposition on the aforesaid shape S projected onto the surface M1. In this way, the plate is preliminarily positioned in the desired theoretical position.

Moreover, the surface M1 also comprises manually operated or automatically operated means MRT for translation of the plate L, to get the plate L to translate from the surface upstream M1 of the surface 2 of the workstation 1.

With reference to FIG. 1, the workstation 1 is located downstream of the machine M and receives from the latter the plate L fed in the longitudinal direction X and generally in direction A. At the end of the machining operation, the workstation 1 will unload the plate L towards a machine MS downstream of the workstation 1.

FIGS. 2 and 3 are two views, in particular a lateral view and a front view, of the workstation 1.

As best seen in FIG. 8, the workstation 1 is equipped with two sliding doors 1p at input to the workstation 1. Normally, these sliding doors 1p are opened to receive the plate from the machine set upstream M and are then re-closed prior to start of machining of the plate L, in particular to prevent exit of debris and machining waste.

Figure 4:
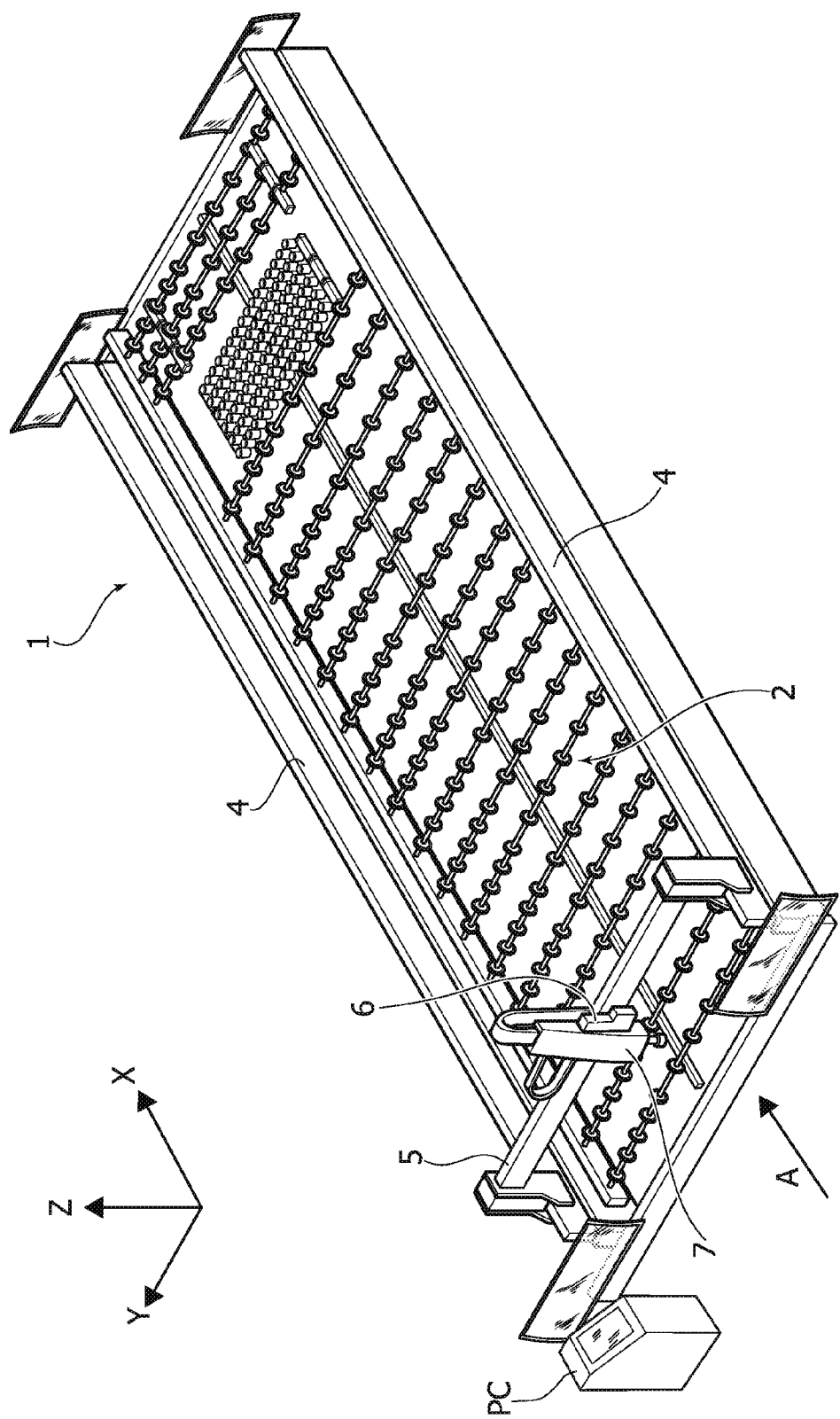
FIGS. 4 to 7 illustrate by way of example the workstation of FIG. 1, and some schematic views of some details that make up the workstation.
Figure 5:
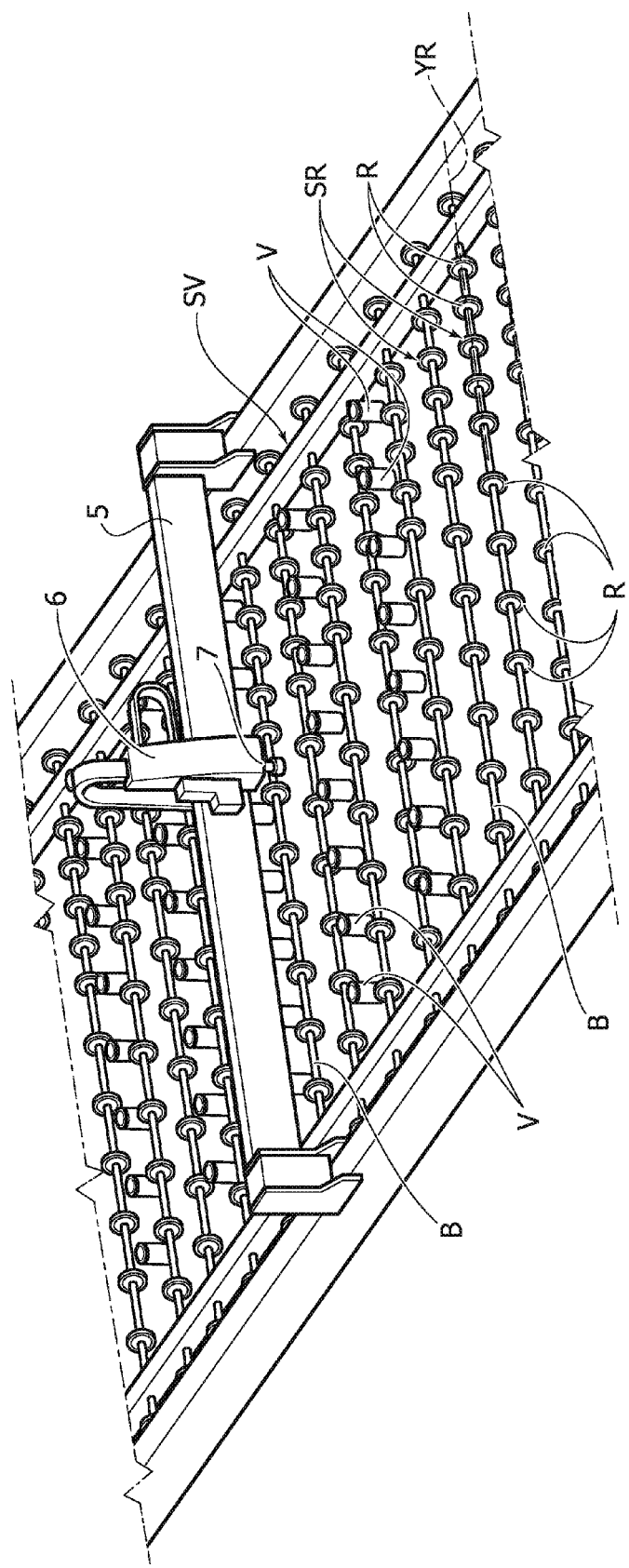
Figure 6:
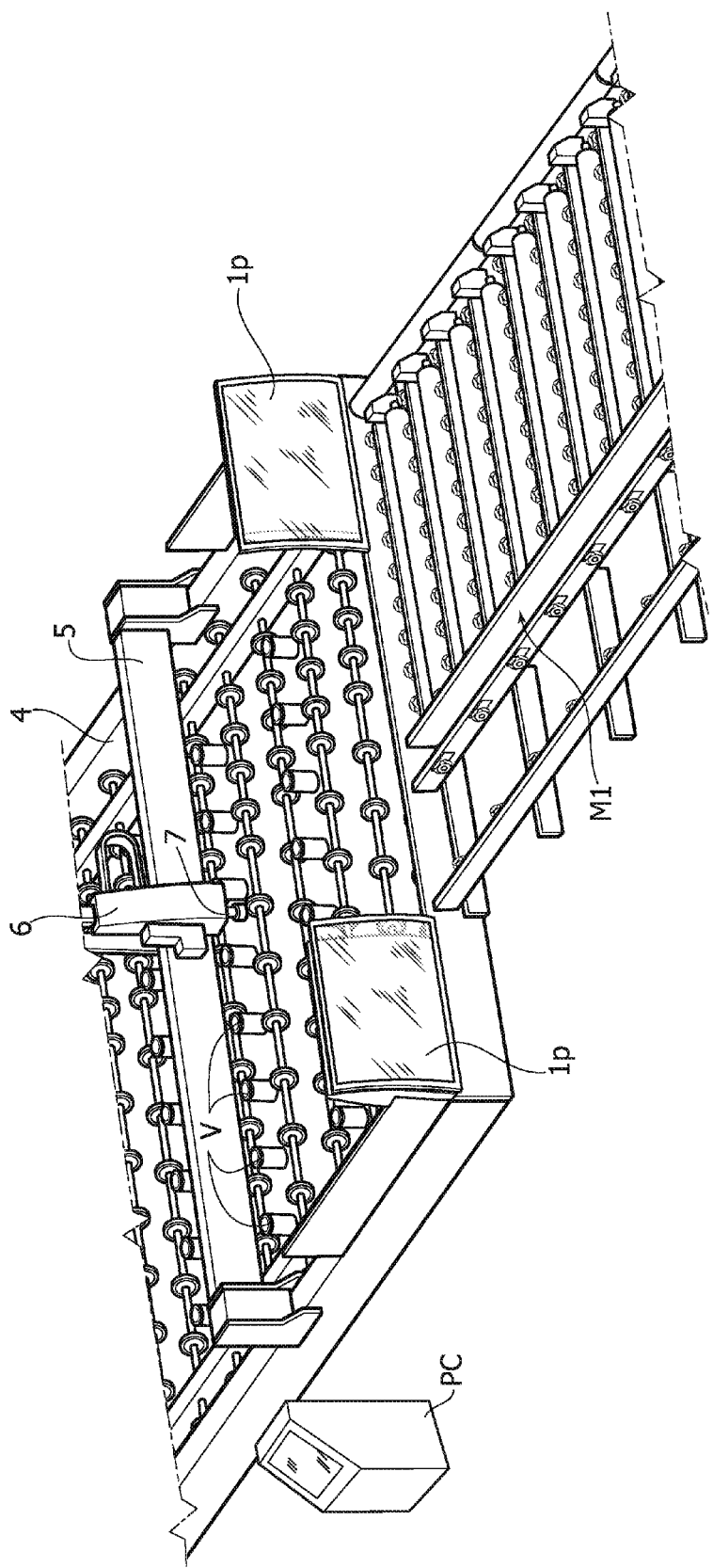
Figure 7:
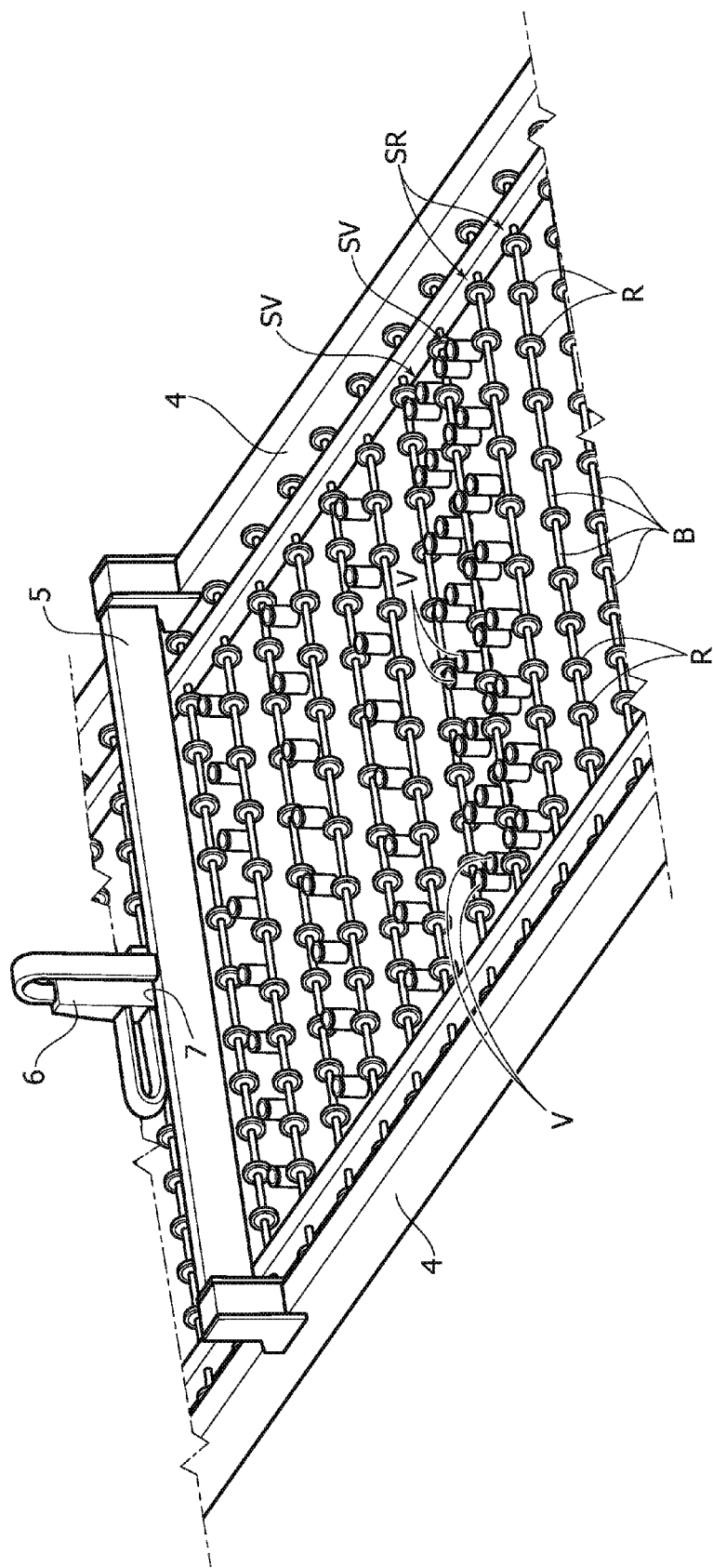

FIG. 4 shows as a whole a workstation 1 for plates of glass, marble, or the like having large dimensions.

With particular reference to FIGS. 4-7, the workstation 1 comprises a bench 2, defining a working surface 3 (not illustrated) designed to receive a plate L to be machined. The bench 2 comprises a plurality of translation means in the form of motor-driven rollers R, aligned and arranged in transverse arrays SR on the bench 2. The rollers R are carried by a plurality of bars B, which extend in a transverse direction on the bench 2. In particular, the rollers R carried by one bar B rotate about a transverse axis of rotation YR that extends along the bar B.

The rollers R carried by the same bar B are fixed with respect to the bar B and turn all together under operation of one and the same motor. Moreover, the bars B are carried by one or more frames. In the case of a plurality of frames, these are controlled in a synchronous way. As has already been said, the rollers R are motor-driven rollers driven in rotation by dedicated electric motors not visible in the figures. In particular, it is possible to provide means for transmitting the movement, which are set between the motor and the bars B.

The rollers R are moreover mobile between a raised, operative, position, in which they are raised to be brought into contact with the bottom surface of the plate L to enable movement of the plate L, and a lowered, resting, position, in which they are set at a distance from the bottom surface of the plate L to enable machining of the plate L. In particular, the aforesaid motor-driven rollers R intervene in the step of transfer of the plate L that envisages an operation of translation of the plate L as far as the initial machining position.

When the rollers R are in their raised, operative, position, they define the aforesaid working surface 3 (the working surface 3 is not represented in the drawings).

The bench 2 of the workstation 1 moreover comprises a plurality of blocking means in the form of telescopic suction cups V aligned and arranged in transverse arrays SV on said bench 2.

Each transverse array SV of suction cups V is set on supporting frames. The transverse arrays SV are arranged in an alternating way with respect to the arrays SR of motor-driven rollers R. The suction cups are consequently arranged to form a matrix of suction cups that cover the bench 2 with each of the suction cups located in the points where the rows and columns cross one another. Each individual suction cup V can be operated separately from the others.

The telescopic suction cups V are mobile between a raised, operative, position, in which they can come into contact with the bottom surface of the plate L and withhold it in position to enable machining of the plate L, and a lowered, resting, position, in which they are set at a distance from the bottom surface of the plate L to enable movement of the plate L via the aforesaid motor-driven rollers R.

The suction cups V moreover communicate with one or more sources of negative pressure (not represented in the drawings).

In a way similar to what has been said previously, when the suction cups V are in their raised, operative, position, they define the aforesaid working surface 3 (the working surface 3 is not represented in the drawings, in so far as it is defined at different moments by the rollers R and/or by the suction cups V).

In some conditions and in some steps of the method, the rollers R and the suction cups V may be located simultaneously in their raised, operative, condition.

Preferentially, the working surface 3 identified by the rollers R in the raised, operative, position, is some millimeters higher than the working surface 3 defined by the suction cups V in the raised, operative, position.

Preferably, the movement in the direction Z of the rollers R and of the suction cups V is brought about by a command with pneumatic action.

The workstation 1 further comprises two fixed sides 4, which extend longitudinally in the direction X and are arranged at the two sides of the working surface 3, and an overhead cross member 5 guided above the two sides 4 like an overhead travelling crane, in the horizontal direction X orthogonal to the horizontal direction Y of the cross member 5.

Mounted on the cross member 5 is a carriage 6 mobile in the aforesaid horizontal direction Y. The carriage 6 carries an operating head 7 mobile on the carriage 6 in the vertical direction Z. The operating head 7 is equipped with a spindle unit including a spindle that can be coupled to a machining tool and the corresponding electric drive motor. For simplicity of representation, the machining tools are not illustrated in the figures.

The workstation 1 further comprises motor means for controlling the movements of the cross member 5, of the carriage 6, and of the operating head 7 along the three orthogonal axes X, Y and Z, respectively. There are also provided motor means for controlling the movements along the axis Z of the arrays SR of rollers R and selectively of the suction cups V.

The above movements, as per the prior art, are controlled by means of respective electric motors and possible control transmissions (not illustrated and not described).

In addition, once again as per the prior art, the electric motors that drive the various mobile parts of the workstation 1 are controlled by electronic control means programmable from a PC to enable execution of predetermined machining cycles on the plates L to be machined.

Among the most significant advantages over the known methods, the method according to the invention enables elimination of the operation of initial repositioning of the plate L, as will emerge in greater detail in what follows.

Operation of the workstation 1 will now be described, and in particular the steps of the method according to the invention.

With reference to FIGS. 10A-10R, the method according to the invention comprises a first step, in which the operator O positions the plate L to be machined on the surface M1 of the machine M upstream of the workstation L (see FIG. 10A).

In a subsequent step, projected on the surface M1 via the aforesaid laser device ML is the shape S of the plate L to be machined (the electronic control consequently knows the shape and the real dimensions of the plate L to be machined).

In particular, it is possible to envisage that the laser device ML will project the entire shape S of the plate L to be machined, to define the desired position in which to set the plate L. Otherwise, it is possible to envisage that the laser device ML will project only a portion of the shape S, ensuring that this portion is sufficient to enable correct positioning of the plate L.

In FIG. 10, the lines of laser light LL projected onto surface M1 define and thus represent the edges of the shape S of the plate that are represented by a dashed line. Otherwise, the perimeter of the plate L is indicated in the drawings with a solid line. In this case, illustrated by way of non-limiting example with reference to FIG. 10B, the laser device ML projects the entire shape S of the plate L.

As may be seen in FIG. 10B, the plate L is normally not aligned with the shape S.

Exploiting the lines of laser light LL as guide and the shape S as reference, the plate L is moved onto the surface M1 (thanks to the degrees of freedom provided by the conveying rollers MRT and by the idle wheels MW) so as to get the sides of the plate L to be superimposed on the lines of laser light LL that define the shape S.

In FIG. 10, in order to render the drawings more readily understandable, the lines represented have been deliberately highlighted, i.e., rendered thicker, so as to be able to represent the shape S and the plate L superimposed thereon.

In actual fact, when the plate is set in its correct position the guidelines of laser light are no longer visible on the surface M1 in so far as they are covered by the edges of the plate L.

Figure 10C:
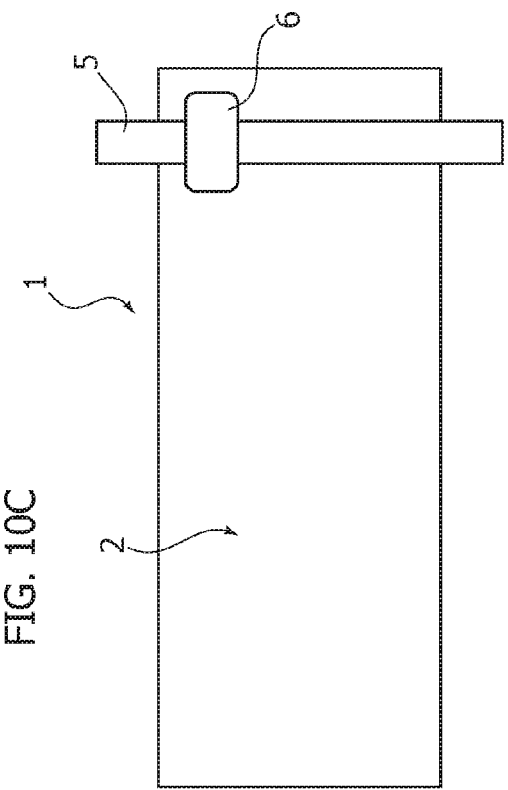
FIG. 10C is a schematic example of an operation step subsequent to FIG. 10B.

The operation of alignment of the plate L with the shape S envisages a first step of longitudinal translation that exploits the conveying rollers MRT to get the plate L to advance so as to position it according to the shape S (step C1, see FIG. 10C).

Figure 10D:
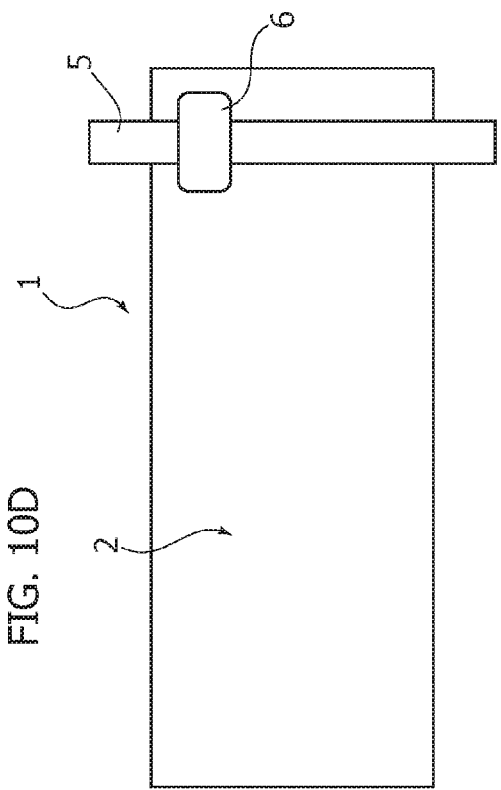
FIG. 10D is a schematic example of an operation step subsequent to FIG. 10C.

In a second step (illustrated in FIG. 10C), the plate is made to rotate (step D2), exploiting the idle wheels MW so as to align the plate L perfectly with the guidelines of laser light and reach the condition illustrated in FIG. 10D.

The initial step of pre-arranging the plate L to be machined on the surface M1 upstream of the workstation 1 in the correct position prior to entry of said plate into the workstation 1 can be carried out in other alternative ways that envisage the aid of other means for movement and/or projection of the shape.

At the end of the step of pre-arrangement of the plate L in the initial desired position, the plate L is ready to be fed to the workstation 1.

Consequently, starting from the condition illustrated in FIG. 10D, the plate L is made to translate in the direction of the workstation 1 via translation means, for example via the conveying rollers MRT. This operation of translation can be carried out in manual mode by the operator O (i.e., with manually operated means), or else in automatic mode by providing means for automatic operation of the translation means.

The plate L is consequently fed in the longitudinal direction X and in the general direction A in order to reach the workstation 1. Illustrated in FIG. 10E is an intermediate step, in which the front edge F of the plate L is about to leave the surface M1 to enter the workstation 1.

By way of clarification, by the term "front edge" or "front" is meant the leading edge of the plate L in the direction of feed X. Conversely, the trailing edge in the direction of feed will be defined are "rear edge".

With reference to FIG. 10E, at input to the workstation 1, the front edge F of the plate L is identified by a sensing system SR and the detection made sets in operation a system for movement of the plate present in the workstation 1 (for example, the motor-driven rollers R).

The sensing system SR for detecting passage of the front edge F of the plate L may be provided in any known way, for example with a photocell or with one or more video cameras that frame the input of the workstation, and returns at output a signal that triggers actuation of the translation means of the workstation 1.

In particular, in concomitance with translation of the plate L through the machine M set upstream, the workstation 1 will start up, enabling the plate L to pass from the machine set upstream M towards the workstation 1.

In the passage between the surface M1 and the surface 3 of the workstation 1, defined by the motor-driven rollers R, the plate L may not maintain the correct position pre-set in the machine M and assume, for example, the position indicated in FIG. 10F. This may be due, for example, to the different rate of rotation of the motor-driven rollers R with respect to the rate of feed of the plate by the machine M. Consequently, the rollers R that receive the plate L may initially slide in contact with the bottom surface of the plate L and cause the plate L to rotate slightly or translate with respect to the correct position. In FIG. 10F, this displacement with respect to the desired position has been greatly accentuated with the purpose of rendering more clearly visible the possible drift of the plate L from the correct position towards a misaligned and rotated position.

The electronic control means, triggered by the passage of the front edge F of the plate L, control the motor means for driving the arrays of motor-driven rollers R and, as a function of the size of the plate L, this information being contained in the machining program, compute the initial position PI into which the plate L must be brought before starting the machining cycle. On the basis of these data (detection of the passage of the front edge F and dimensions of the plate L), the electronic control means define the time for actuation of the motor-driven rollers R necessary to bring the plate L roughly up to the initial position PI.

A preferred embodiment also comprises a second element SR for detecting the part of front edge of the plate closest to the position PI (not illustrated in the figures) and with this information the count of the space to be covered for positioning the plate in the ideal machining position PI with the least error is started.

Consequently, once the plate L has been completely received by the surface of the workstation 1, as illustrated in FIG. 10G, it must be made to advance further as far as the aforesaid initial position PI indicated by the dotted line in the figures. This position is the ideal machining position, also defined as working origin. The program for actuation of the cycle of machining of the plate L, i.e., the commands to be imparted simultaneously on the cross member 5, on the carriage 6, and on the operating head 7, in order to carry out on the plate L the desired machining operation, have this position PI as reference origin.

FIG. 10H illustrates the plate L at the end of the step of longitudinal translation, and, as may be noted, the plate L is slightly rotated with respect to the ideal initial position PI and is in the real position PR.

Consequently, once the condition illustrated in FIG. 10H is reached, the motor-driven rollers R are stopped, and the plate is ready for the desired machining operation.

At this point, in known workstations, the plate L would be rotated and moved in order to arrange it according to the desired initial position PI, i.e., so as to get the real position PR to correspond to the ideal position PI. This operation of automatic rotation and movement is rather laborious, involving in the prior art a plurality of different devices in order to complete correct initial positioning of the plate.

Instead, in the method according to the invention, at this point the real position PR of the plate L is detected by means of an electronic position-detection system SRP.

The electronic position-detection system SRP may comprise, in combination or alternatively:
   an optical sensing unit for detecting the position of the plate L including a plurality of video cameras configured for framing the surface 2 and processing the images acquired by means of an application that enables extrapolation of information on the position of the plate L itself;
   an optoelectronic laser-light system (or equivalent system); and/or
   a feeler element, which is used for detecting some points of the profile of the plate L and is brought into contact with the lateral surface of the plate L.

Preferably, the aforesaid electronic position-detection system SRP is carried by the operating head 7.

Illustrated in FIGS. 10I, 10L, 10M, and 10N is a possible sequence of detection of position that envisages, by way of non-limiting example, acquisition, by means of one of the aforesaid systems, of at least three points, in the specific case four points P1, P2, P3, P4 of the plate L.

In particular, the method envisages displacement of the operating head 7 along the sides of the plate L to bring the position-detection system SRP into a position where it can detect at least three points of the plate L. The electronic control means are configured for calculating, on the basis of the size and of the geometry of the plate L and of the points detected by the position-detection system SRP, the real position and orientation PR of the plate with respect to the working surface of the workstation 1.

From processing of the data available information is provided regarding the position PR of the plate L itself.

In particular, the electronic control means are configured for determining the difference of position between the desired initial theoretical position PI and the real position PR of the plate L. In particular, there will be computed the corrections of the co-ordinates of the plate L to be made to the program for actuation of the cycle of machining of the plate L in order to displace the reference system so as to centre it with respect to the real position PR of the plate L.

At this point, the electronic control means can modify the program for actuation of the cycle of machining of the plate L on the basis of detection of the real position made in the previous step. In particular, the paths followed by the operating head 7 (i.e., the displacements of the cross member along the sides and of the carriage on the cross member) must be modified to take into account the difference of position between the ideal position PI and the real position PR.

In practice, the new co-ordinates of movement are expressed according to a local reference system of the plate L, for example a reference system centred at one of the vertices of the plate L itself. In this way, the cycle of machining of the plate L will assume a new origin that coincides with the real position of the plate L, and this correction serves to compensate the initial incorrect position.

At the end of the operations of detection of the real position PR and of recalculation of the paths, the control system knows the real position PR of the plate L and the new paths that it must impose on the operating head 7 for carrying out machining of the plate L set in the position PR.

On the basis of the above information, the control system is moreover programmed for selecting, on the basis of the dimensions and geometry of the plate L and of the real position and orientation detected, which blocking means to use to withhold the plate in position during machining. In particular, the control system selects which suction cups V* of the aforesaid plurality to use for supporting and blocking the plate L during machining. The suction cups selected V* are chosen so that the machining tools carried by the operating head 7 will not interfere during machining with the aforesaid suction cups V.

In greater detail, the software of the control system makes a comparison between the ideal position PI of the plate and the real position PR detected and, on the basis of the deviation of position, will automatically exclude, in the case where this were necessary, the suction cups that, if they were to remain in the blocking position, would collide with the machining tools carried by the operating head 7.

In particular, with reference to FIG. 10O, the suction cups selected V*, i.e., the suction cups to be used, are indicated by the black circles, whereas the suction cups discarded are indicated by the white circles.

In greater detail, the suction cups V* that are completely covered by the plate L, and at a certain distance from the edges of the plate L, can be activated. The suction cups that are only partially covered by the plate L would not in any case be able to perform their function of blocking means, in so far as it would not be possible to create a vacuum. Furthermore, these partially covered suction cups would interfere with the machining tools carried by the operating head 7 and prevent correct movement thereof.

The example illustrated in FIGS. 10O and 10P represents the selection of the suction cups V* in the case of machining of the edges of the plate L.

Instead, FIG. 10Q shows the suction cups V* selected in the case where there has to be carried out a drilling operation, in order, for example, to make a through hole having a circular shape FC at the centre of the plate L. In this case, the suction cups V** in the proximity of this through hole are discarded.

The method described herein at this point envisages that the suction cups V* selected are brought into their raised, operative, position, and the means for transfer of the plate are lowered so as to bring the suction cups V* into contact with the bottom surface of the plate L (see FIG. 10P) and thus bring them into the condition of engagement with the plate L.

With the motor means for controlling the movements of the motor-driven rollers R it is possible to lower in a synchronous way all the frames that carry the bars B on which the motor-driven rollers R are mounted. In this way, the motor-driven rollers R are brought into their lowered, resting, position in which they are set at a distance from the bottom surface of the plate L. This operation of disengagement of the motor-driven rollers R is essential in so far as the edges of the plate L and the inner portions of the plate L to be machined must be free and accessible by the machining tools carried by the operating head 7.

Next, once brought into position, the suction cups selected V* are activated by being set in fluid communication with a vacuum source (not illustrated in the figures) in such a way as to exert an action of suction on the bottom face of the plate L, for blocking the plate L and keeping it in position during machining.

The above vertical displacements of the suction cups V* and of the rollers R may, for example, be controlled by a hydraulic actuator, a pneumatic actuator, an electromechanical actuator comprising an electric motor and an external screw/internal screw system controlled by the electric motor, or any transmission.

At this point, the plate L is in the condition for carrying out the required machining operation.

To carry out machining of the plate the method described herein envisages the step of driving the motor means for controlling the movements of the cross member 5, of the carriage 6, and of the operating head 7 on the basis of the modified actuation program, as seen previously.

In practice, while the plate L is kept stationary with the aid of the suction-cup blocking means V*, the operating head 7 is moved along the peripheral profile or within the surface of the plate L for carrying out the required machining operations. These displacements follow the new paths calculated on the basis of the real position PR of the plate L.

At the end of the machining operations, the operating head 7 is brought back into a parking position, and the plate L can be released. In particular, the supply of the negative pressure created by the vacuum source is interrupted, and the suction cups V* are no longer constrained to the bottom surface of the plate L.

Next, with the motor means for controlling the vertical movements of the rollers R it is possible to raise in a synchronous way all the frames that carry the bars B on which the motor-driven rollers R are mounted. In this way, the motor-driven rollers R are brought into their raised, operative, position, in which they are in contact with the bottom surface of the plate L. When the plate L is taken up by the translation means, the suction cups V* can be brought back into their lowered, resting, condition, thus disengaging the bottom surface of the plate L.

At the end of this step, the plate is ready to be transferred downstream of the workstation 1, for example on a machine MS for washing and drying of the plate L.

The step of transfer of the plate L envisages bringing the motor-driven rollers R back into their raised, operative, position at the end of machining of the plate L to enable movement of the plate L downstream of the workstation 1, i.e., towards the output of the workstation 1. In this condition, the motor-driven rollers R are activated, and their rotation imposed by the electric driving motor causes the plate L to advance (see FIG. 10R).

As mentioned previously, downstream of the workstation 1 there may be a machine MS for further operations of machining of the plate L, or alternatively there may be an unloading station, where the semi-finished plate L is positioned waiting to be transferred to another machine.

In an alternative embodiment, it is possible to envisage that the plate L, at the end of the machining operation, leaves the workstation 1 on the same side from which it arrived; i.e., it returns upstream on the machine M.

In particular, the method for machining plates of glass, stone, marble, or the like enables the required machining operations to be carried out by feeding the plate L in a position close to the initial working position, without the need for repositioning it to get the real position to correspond to the desired theoretical initial position.

As compared to the known solutions, the step of repositioning of the plate in the workstation 1 is eliminated, and there is added a step of detection of the real position, followed by a step of modification and recalculation of the program for actuation of the machining cycle on the basis of the real position detected.

On the basis of the input data, the geometry of the plate, and the real position, it will be possible to select the suction-cup blocking means to be activated so as not to interfere with the machining tools.

Consequently, without prejudice to the principle of the invention, the details of construction and the embodiments may vary, even significantly, with respect to what has been described and illustrated herein, purely by way of non-limiting example, without thereby departing from the scope of the invention, as defined by the ensuing claims.

What is claimed is:

1. A method for machining a large plate in a workstation for machining plates, the workstation comprising:
   a bench, defining a working surface extending in a horizontal X direction and a horizontal Y direction orthogonal to the X direction, the bench having opposed two sides positioned along the X direction, the working surface designed to receive a plate to be machined;

a plurality of motor-driven rollers, aligned and arranged in transverse arrays on said bench, said motor-driven rollers being mobile between a raised, operative, position, in which they are in contact with the bottom surface of the plate for moving the plate, and a lowered, resting, position, in which they are set at a distance from the bottom surface of the plate to enable machining of the plate;

a plurality of telescopic suction cups aligned and arranged in transverse arrays on said bench, in an alternated way with respect to said arrays of motor-driven rollers, said suction cups being mobile between a raised, operative, position, in which they are in contact with the bottom surface of the plate and withhold the plate in position to enable machining of the plate, and a lowered, resting, position, in which they are set at a distance from the bottom surface of the plate to enable movement of the plate via the said motor-driven rollers;

two fixed sides, arranged at the two sides of the working surface;

an overhead cross member positioned above the working surface along the Y direction the cross member operable to selectively move in the X direction;

a carriage engaged with the cross member and selectively mobile relative to the cross member;

an operating head engaged with the carriage and selectively mobile relative to the carriage in a vertical direction Z, the operating head including a spindle selectively engaged with a machining tool, and an electric drive motor;

a motor for controlling the movements of the cross member, of the carriage, and of the operating head along the three X, Y, and Z directions, respectively;

a motor for controlling the movements of said arrays of rollers and selectively of said suction cups along the axis Z; and an electronic device for controlling said motors, the method comprising the following steps:

pre-arranging on a resting surface upstream of the workstation the plate to be machined in a correct position prior to entry of said plate into the workstation;

feeding said plate in the correct position into the workstation and causing it to advance longitudinally in the X direction along said working surface defined by said motor-driven rollers, operating said motor-driven rollers until the plate is brought into an initial machining position;

detecting a real position and orientation of said plate with respect to said working surface by a position-detection system;

modifying a program for actuation of the cycle of machining of the plate on the basis of the detection of the real position; and machining the plate by operating the motor for controlling movement of the cross member, of the carriage, and of the operating head on the basis of the modified program for actuation of the machining cycle.

2. The method according to claim 1, wherein said step of pre-arranging on a surface the plate to be machined in the correct position prior to entry into the workstation comprises projecting on said resting surface upstream of the workstation guidelines that represent a complete or partial geometry of the actual dimensions of the plate to be machined, the guidelines defining the correct position prior to entry of said plate into said workstation.

3. The method according to claim 2, comprising the step of pre-arranging on said resting surface upstream of the workstation means for assisting movement of the plate in any direction relative to the resting surface with an operating force of low intensity.

4. The method of claim 1 wherein said step of feeding the plate to the workstation comprises providing one of manually operated or automatically operated means for translation of the plate from the resting surface upstream to the working surface of the workstation.

5. The method according to claim 1 further comprising the steps of:

pre-arranging on the workstation a sensor for detecting passage of a front edge of the plate;

calculating, on the basis of dimensions and geometry of the plate, and of said detection of the passage of the front edge, an amount of longitudinal advance to be imparted upon the plate so as to set the plate in a desired machining position; and operating said motor of the motor-driven rollers on the basis of the calculated advance to be imparted to move the plate until it reaches the desired machining position.

6. The method of claim 1 further comprising the steps of:

pre-arranging on the operating head a system for detecting the position of the plate that comprises an optical sensor;

displacing said operating head along the sides of the plate to bring said optical sensor into a position operable to detect at least three points of the plate; and calculating, on the basis of the plate dimensions, of the geometry of the plate, and of the at least three points detected by the optical sensor, the real position and orientation of the plate with respect to the working surface of the workstation.

7. The method according to claim 6 further comprising the steps of:

selecting, on the basis of the dimensions and of the geometry of the plate and of the real position and orientation calculated, which suction cups of said plurality to use for supporting and blocking the plate during machining so that the selected suction cups will not interfere with machining tools carried by said operating head; and selectively moving said selected suction cups into their raised, operative, position.

8. The method according to claim 7 further comprising the steps of:

moving said plurality of motor-driven rollers into their lowered, resting, position, in which they are set at a distance from a bottom surface of the plate to enable machining of the plate;

activating the selected suction cups by establishing fluid communication with a vacuum source in such a way as to exert an action of suction on the bottom surface of the plate to block the plate in position; and machining the plate by operating the motor for controlling the movements of the cross member, of the carriage, and of the operating head on the basis of the modified actuation program.

9. The method according to claim 8 further comprising the steps of:

de-activating the selected suction cups by interrupting communication with said vacuum source;

moving said plurality of motor-driven rollers to their raised, operative, position at the end of machining of the plate;

moving the selected suction cups into their lowered, resting, position; and moving the machined plate towards an output of the workstation for subsequent operations.

10. A method for processing a large plate in a workstation, the workstation including a bench having motorized drive, a cross-member having a carriage and an operating head movable relative to the bench, and a blocking device for selectively engaging the plate while positioned in the workstation, the method comprising the steps of:
   storing in a memory storage device a desired initial position for plate processing and a program for plate processing positioned in a workstation;
   engaging a plate to be processed with the workstation motorized drive;
   moving the plate onto a working surface in the workstation;
   detecting through an imaging device a real position of the plate positioned in the workstation;
   selectively engaging a plurality of vacuum suction cups positioned completely beneath the plate to the plate to prevent movement of the plate relative to the station;
   comparing the plate real position to the desired initial position and determining a positional difference of the plate between the desired initial position and the real position;
   modifying the stored program for plate processing to accommodate the determined positional difference of the plate; and
   processing the plate in the real position thereby avoiding further positioning of the plate relative to the bench.

11. A workstation for processing a large plate, the workstation comprising:
   an elongate bench having a working surface extending in a longitudinal X direction and an orthogonal Y direction, the working surface supporting the plate when positioned in the workstation;
   a cross-member engaged with the bench and selectively movable relative to the bench;
   a carriage engaged with the cross-member and selectively movable relative to the cross-member, the carriage including an operating head selectively movable relative to the carriage;
   a plurality of powered rollers connected to the bench operable to selectively move the plate along the X-direction, the rollers in communication with a motor, the plurality of rollers selectively movable between an operative position defining the bench working surface and a lower position distant from the working surface;
   a plurality of suction cups positioned in alternating positions with respect to the plurality of rollers and in fluid communication with a vacuum source, the plurality of suction cups selectively movable between an operative position defining the bench working surface and a lower position distance from the working surface, selective of the suction cups operative to engage through vacuum force the plate when positioned over the selected of the suction cups;
   a memory device for storing a desired position of the plate for processing in the workstation and a program for processing the plate;
   an electronic position detection device in communication with the bench and memory device operative to image the plate and store a real position of the plate positioned in the workstation; and
   an electronic control device for comparing the imaged plate real position to the stored plate desired position, the control device operative to determine a positional difference between the plate desired position and the stored real position and to modify the processing program for processing the plate based on the determined positional difference between the desired position and the real position.

12. The workstation of claim 11 further comprising a machine table positioned upstream of the workstation, the machine table comprising:
   a resting surface for supporting the plate prior to entering the workstation;
   a plurality of rollers connected to table for selectively moving the plate in the X direction;
   a plurality of idler wheels connected to the table for selectively moving the plate in the Y direction; and
   a laser device operable to project a geometric image configuration of at least a portion of the plate onto the resting surface to provide a guide to properly positioning the plate relative to the workstation prior to entering the workstation.

* * * * *